(12) United States Patent
Lovett (10) Patent No.: US 10,948,189 B2
(45) Date of Patent: Mar. 16, 2021

(54) ENHANCEMENT FOR FUEL SPRAY BREAKUP

(71) Applicant: United Technologies Corporation, Farmington, CT (US)

(72) Inventor: Jeffery A. Lovett, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 151 days.

(21) Appl. No.: 16/222,568

(22) Filed: Dec. 17, 2018

(65) Prior Publication Data
US 2020/0191396 A1 Jun. 18, 2020

(51) Int. Cl.
| | | |
|---|---|---|
| F23R 3/28 | (2006.01) | |
| F02C 7/22 | (2006.01) | |
| F02C 9/26 | (2006.01) | |
| F02C 9/28 | (2006.01) | |
| F23R 3/34 | (2006.01) | |
| F23D 14/70 | (2006.01) | |

(52) U.S. Cl.
CPC ............... *F23R 3/28* (2013.01); *F02C 7/22* (2013.01); *F02C 9/26* (2013.01); *F02C 9/28* (2013.01); *F23R 3/346* (2013.01); *F05D 2220/32* (2013.01); *F23D 14/70* (2013.01); *F23D 2900/14481* (2013.01)

(58) Field of Classification Search
CPC .... F23R 3/28; F23R 3/20; F23R 3/346; F02C 9/28; F23D 14/70; F23D 2900/14481
See application file for complete search history.

(56) References Cited

U.S. PATENT DOCUMENTS 2,930,192 A * 3/1960 Johnson .................... F23R 3/14
60/746
3,302,399 A * 2/1967 Anthony ................. F23D 11/24
60/740

(Continued)

FOREIGN PATENT DOCUMENTS

| EP | 1279897 A2 | 1/2003 |
| EP | 2993405 A1 | 3/2016 |
| WO | 2013115671 A1 | 8/2013 |

OTHER PUBLICATIONS

European Search Report Application No. EP19217150: dated Mar. 26, 2020; pp. 6.

*Primary Examiner* — Gerald L Sung
*Assistant Examiner* — Rene D Ford
(74) *Attorney, Agent, or Firm* — Cantor Colburn LLP (57) ABSTRACT

A combustor or augmentor of a gas turbine engine is provided. The combustor or augmentor includes a wall defining apertures and an interior having an inlet, an outlet and a mixing region between the inlet and the outlet and fuel injectors. The fuel injectors are respectively arrayed along the wall at corresponding apertures to inject fuel into the mixing region. Each fuel injector includes a fuel injector body defining an injection outlet through which fuel exits the fuel injector body toward the mixing region and a pintle. The pintle includes a first end, a second end and a pintle body extending between the first and second ends. At least one of the first and second ends is attachable to the fuel injector body to position the pintle body between the injection outlet and the mixing region.

15 Claims, 6 Drawing Sheets

(56) References Cited

U.S. PATENT DOCUMENTS

| | | | |
|---|---|---|---|
| 4,989,404 A * | 2/1991 | Shekleton | ............... F02C 7/26 |
| | | | 60/743 |
| 5,233,825 A | 8/1993 | Shekleton | |
| 5,265,425 A | 11/1993 | Howell | |
| 10,066,836 B2 | 9/2018 | Snyder et al. | |
| 2012/0138710 A1 | 6/2012 | Hicks et al. | |
| 2014/0158796 A1 | 6/2014 | Buelow et al. | |
| 2016/0305665 A1 | 10/2016 | Tanaka et al. | |
| 2016/0320063 A1 | 11/2016 | Dai et al. | |

\* cited by examiner

ENHANCEMENT FOR FUEL SPRAY BREAKUP

BACKGROUND

Exemplary embodiments of the present disclosure relate generally to fuel spraying and, in one embodiment, to an enhancement to promote fuel spray breakup.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors and the turbine section includes low and high pressure turbines.

Within the compressor section, high energy fluids aerodynamically interact with blades and vanes such that air flowing into the gas turbine engine can be compressed. Likewise, within the turbine section, high energy fluids, such as the products of combustion, aerodynamically interact with blades and vanes in order to expand and to thereby drive compressor and rotor rotation.

Gas turbine engines typically use fuel injectors to introduce fuel into the combustor section as well as afterburner sections. The fuel injectors often employ a multitude of holes or orifices to spray the fuel under pressure into the combustor section. The fuel spray is created by hydrodynamic breakdown of a liquid column of fuel into individual droplets through complex primary and secondary breakup mechanisms. These mechanisms depend strongly on the velocities of the liquid and on nearby gas flows. The breakup processes therefore change in location and intensity depending on various operating conditions. Because of this variation, the location and the quality of the fuel spray correspondingly varies substantially over the operating range of the gas turbine engines. The variations in the location and the quality of the fuel spray over the operating range of the gas turbine engines can present challenges to control of the combustion processes at certain conditions.

BRIEF DESCRIPTION

According to an aspect of the disclosure, a combustor or augmentor of a gas turbine engine is provided. The combustor or augmentor includes a wall defining apertures and an interior having an inlet, an outlet and a mixing region between the inlet and the outlet and fuel injectors. The fuel injectors are respectively arrayed along the wall at corresponding apertures to inject fuel into the mixing region. Each fuel injector includes a fuel injector body defining an injection outlet through which fuel exits the fuel injector body toward the mixing region and a pintle. The pintle includes a first end, a second end and a pintle body extending between the first and second ends. At least one of the first and second ends is attachable to the fuel injector body to position the pintle body between the injection outlet and the mixing region.

In accordance with additional or alternative embodiments, the at least one of the first and second ends is attachable to the fuel injector body such that the pintle body is angled toward the outlet.

In accordance with additional or alternative embodiments, the at least one of the first and second ends is attachable to the fuel injector body such that the pintle body is angled toward the inlet.

In accordance with additional or alternative embodiments, the pintle body defines a shaped aperture and the first and second ends are attachable to the fuel injector body such that fuel exiting the fuel injector body through the injection outlet flows through the shaped aperture.

In accordance with additional or alternative embodiments, the shaped aperture has one of an elliptical and an angular shape.

In accordance with additional or alternative embodiments, the pintle has one of a flat, convex and concave shape.

In accordance with additional or alternative embodiments, a connection point between the at least one of the first and second ends and the fuel injector body is variable relative to the injection outlet.

In accordance with additional or alternative embodiments, the at least one of the first and second ends is electromagnetically attachable to the fuel injector body.

In accordance with additional or alternative embodiments, a controller is operably coupled to each fuel injector and configured to control operations of each pintle.

According to another aspect of the disclosure, a combustor or augmentor of a gas turbine engine is provided. The combustor or augmentor includes a wall defining apertures and an interior having an inlet, an outlet and a mixing region between the inlet and the outlet and fuel injectors. The fuel injectors are respectively arrayed along the wall at corresponding apertures to inject fuel into the mixing region. Each fuel injector includes a fuel injector body defining an injection outlet through which fuel exits the fuel injector body toward the mixing region and a pintle. The pintle includes a first end, a second end and a pintle body extending between the first and second ends. At least one of the first and second ends is attachable to the fuel injector body to position the pintle body between the injection outlet and the mixing region. Operations of the pintle of each fuel injector are independently controllable in accordance with current combustor conditions.

In accordance with additional or alternative embodiments, the current conditions include inlet airflow conditions, fuel flow conditions and combustion conditions.

In accordance with additional or alternative embodiments, a controller is operably coupled to each fuel injector and configured to control operations of each pintle.

According to another aspect of the disclosure, a fuel injector is provided and includes a fuel injector body defining an injection outlet at which fuel exits the fuel injector body and a pintle. The pintle includes a first end, a second end and a pintle body extending between the first and second ends. At least one of the first and second ends is attachable to the fuel injector body to position the pintle body to interact with fuel exiting the fuel injector body through the injection outlet.

In accordance with additional or alternative embodiments, the at least one of the first and second ends is attachable to the fuel injector body such that the pintle body is angled in a first direction or in a second direction, respectively.

In accordance with additional or alternative embodiments, the pintle body defines a shaped aperture and the first and second ends are attachable to the fuel injector body such that fuel exiting the fuel injector body through the injection outlet flows through the shaped aperture.

In accordance with additional or alternative embodiments, the shaped aperture has one of an elliptical and an angular shape.

In accordance with additional or alternative embodiments, the pintle has one of a flat, convex and concave shape.

In accordance with additional or alternative embodiments, a connection point between the at least one of the first and second ends and the fuel injector body is variable relative to the injection outlet.

In accordance with additional or alternative embodiments, the at least one of the first and second ends is electro-magnetically attachable to the fuel injector body.

In accordance with additional or alternative embodiments, a combustion chamber of a combustor or an augmentor is provided and includes the above-noted fuel injector.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
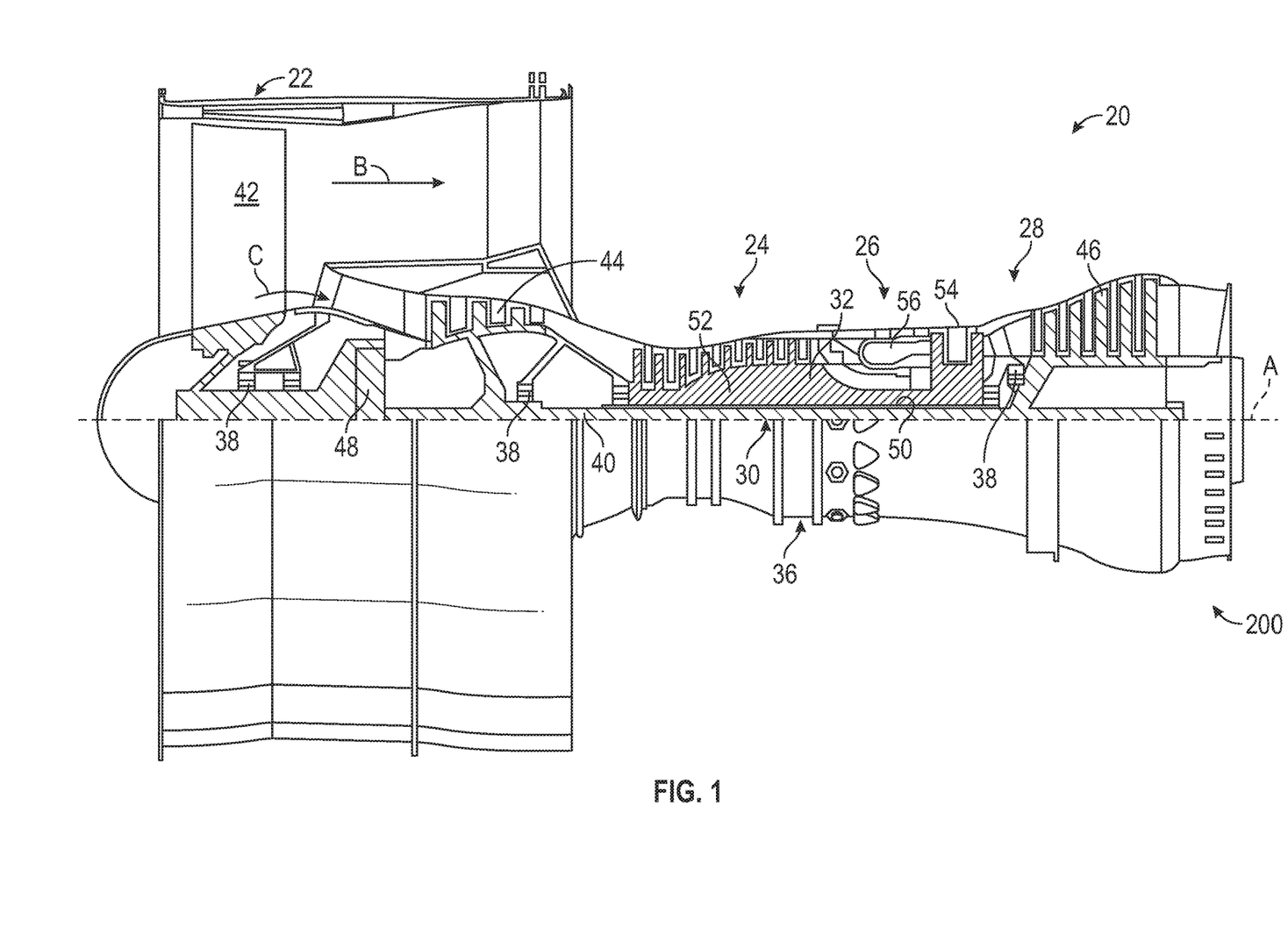
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

As will be described below, a mechanical device is provided in order to force an atomization process of a fuel injector to occur with less variation in quality and position over various operating conditions. The mechanical device causes rapid atomization of liquid fuel with less dependence on liquid and gas conditions and, in one embodiment, the mechanical device includes a mechanical pintle at an exit of a fuel injector. In such a case, a jet of liquid fuel impinges on the pintle and the pintle causes the atomization process to occur immediately at the pintle for all operating conditions and assists the atomization process by causing strong velocity gradients in the liquid flow which leads to atomization of the liquid jet. In another embodiment, the mechanical device uses a shaped injector hole which causes strong velocity gradients in the liquid flow that creates rapid atomization immediately after injection that alters the atomization and also can be less sensitive to operating conditions.

Figure 2:
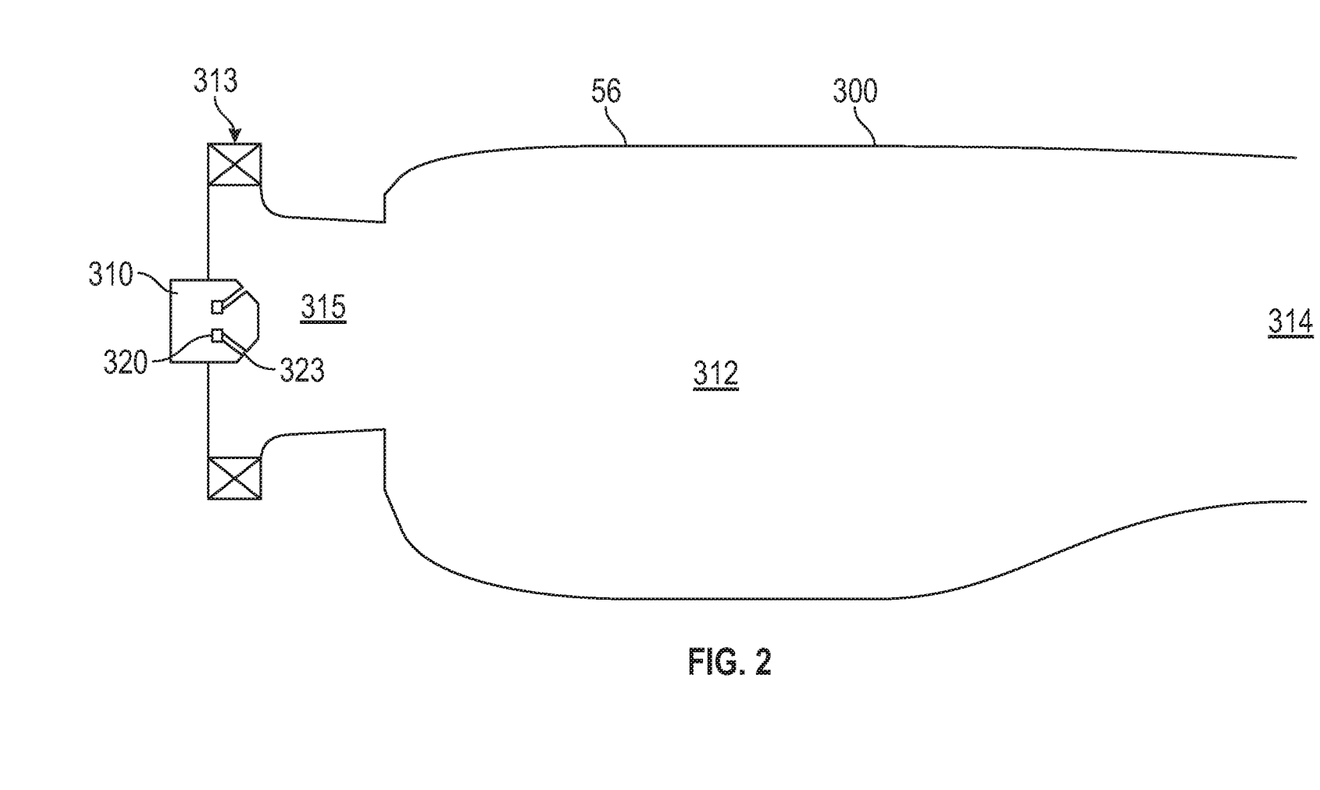
FIG. 2 is a schematic side view of a combustor in accordance with embodiments.

With reference to FIG. 2, a combustion chamber or an exemplary combustor 56 of the gas turbine engine 20 that is described above (see FIG. 1) is provided and includes a combustor wall 300 and fuel nozzles 310. The combustor wall 300 is formed to define a combustor interior 312. The combustor interior 312 has an inlet portion 313, an outlet portion 314 and a mixing region 315. The mixing region 315 is axially interposed between the inlet portion 313 and the outlet portion 314. The inlet portion 313 is receptive of compressed air from the compressor section 24 (see FIG. 1). The compressed air flows through the mixing region 315 toward the outlet portion 314. Within the mixing region 315, the compressed air mixes with fuel that is injected into the mixing region 315 by the fuel nozzle injectors 320 located in the fuel nozzle 310. The fuel nozzle injectors 320 are configured to inject fuel into the mixing region 315 via fuel injector openings 323.

Figure 3:
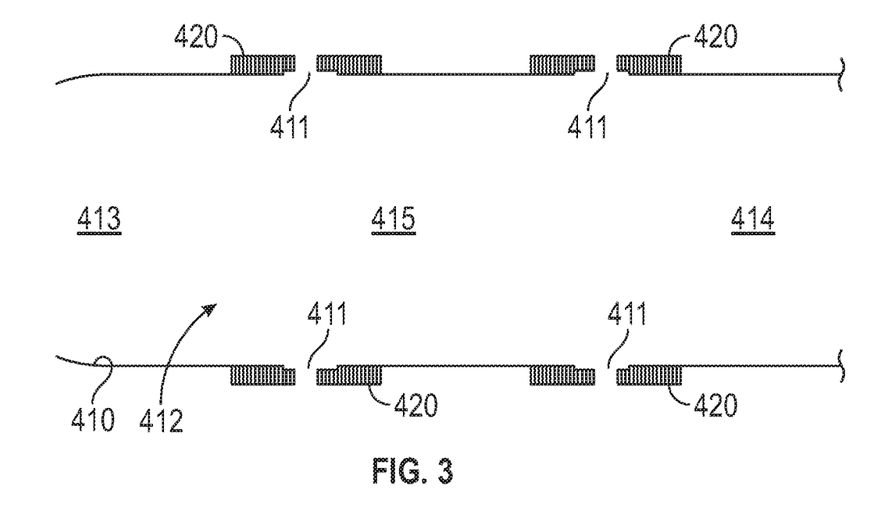
FIG. 3 is a schematic side view of a combustor or augmentor in accordance with embodiments.

With reference to FIG. 3, a combustion chamber or an exemplary combustor or augmentor of the gas turbine engine 20 that is described above (see FIG. 1) is provided and includes walls 410 and fuel injectors 420 to create a fuel mixing passage. The walls 410 are formed to define apertures 411 at various axial and circumferential positions and a mixing section interior 412. The mixing section interior 412 has an inlet portion 413, an outlet portion 414 and a mixing region 415. The mixing region 415 is axially interposed between the inlet portion 413 and the outlet portion 414. The inlet portion 413 is receptive of compressed air from the compressor section 24 (see FIG. 1) for a combustor, or receptive of turbine exhaust gas from the turbine 200 in the case of an augmentor. The air flows through the mixing region 415 toward the outlet portion 414. Within the mixing region 415, the compressed air mixes with fuel that is injected into the mixing region 415 by the fuel injectors 420. The fuel injectors 420 are respectively arrayed along the walls 410 at corresponding apertures 411 and are configured to inject fuel into the mixing region 415.

Figure 4:
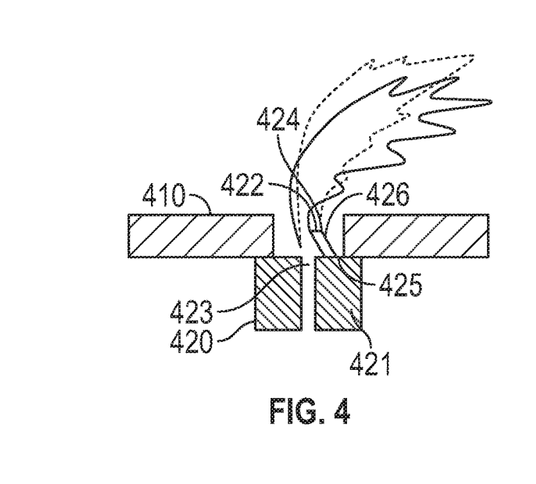
FIG. 4 is a schematic side view of a fuel injector with a pintle of the combustor of FIG. 2 or the combustor or the augmentor of FIG. 3 in accordance with embodiments.
Figure 5:
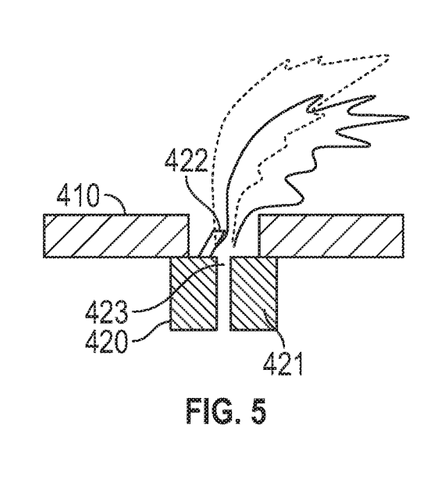
FIG. 5 is a schematic side view of a fuel injector with a pintle of the combustor of FIG. 2 or the combustor or the augmentor of FIG. 3 in accordance with embodiments.
Figure 6:
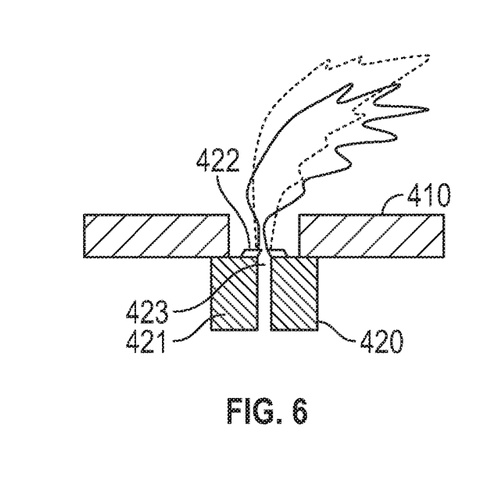
FIG. 6 is a schematic side view of a fuel injector with a pintle of the combustor of FIG. 2 or the combustor or the augmentor of FIG. 3 in accordance with embodiments.

With continued reference to FIGS. 2 and 3 and with additional reference to FIGS. 4, 5 and 6, each fuel injector 420 includes a fuel injector body 421 and a pintle 422. An interior facing side of the fuel injector body 421 abuts with an exterior surface of the wall 410. The fuel injector body 421 has an elongate shape that extends outwardly from the exterior surface of the wall 410 and defines an injection outlet 423 through which fuel exits the fuel injector body 421 in a direction oriented toward the mixing region 415.

As shown in FIG. 4, the pintle 422 includes a first end 424, a second end 425 and a pintle body 426 that extends between the first end 424 and the second end 425. At least one or both of the first end 424 and the second end 425 is/are attachable to the interior facing side of the fuel injector body 421 to thereby position the pintle body 426 between the injection outlet 423 and the mixing region 415.

That is, if the first end 424 is defined as an upstream end and the second end 425 is defined as a downstream end, the second end 425 could be attached to the fuel injector body 421 such that the pintle body 426 is angled toward the inlet portion 413 (see FIG. 4) or the first end 424 could be attached to the fuel injector body 421 such that the pintle body 426 is angled toward the outlet portion 414 (see FIG. 5).

Figure 7:
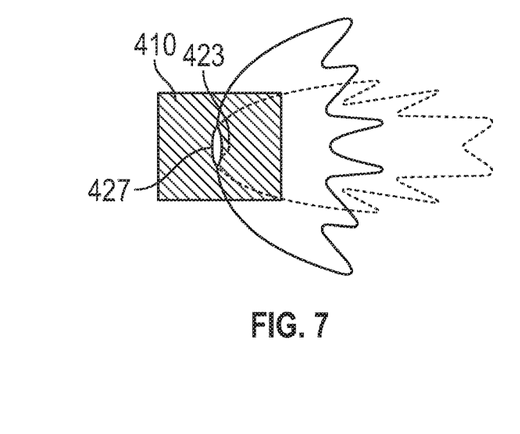
FIG. 7 is a schematic radial view of a fuel injector with a pintle of the combustor of FIG. 2 or the combustor or the augmentor of FIG. 3 in accordance with embodiments.
Figure 8:
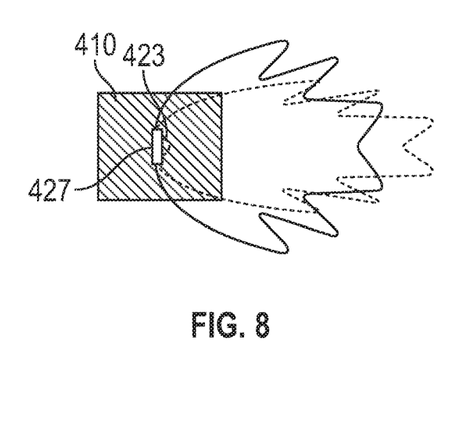
FIG. 8 is a schematic radial view of a fuel injector with a pintle of the combustor of FIG. 2 or the combustor or the augmentor of FIG. 3 in accordance with embodiments.
Figure 9:
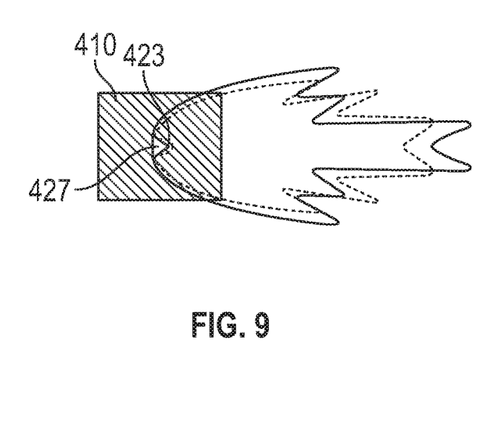
FIG. 9 is a schematic radial view of a fuel injector with a pintle of the combustor of FIG. 2 or the combustor or the augmentor of FIG. 3 in accordance with embodiments.

With continued reference to FIG. 6 and with additional reference to FIGS. 7, 8 and 9, in accordance with additional alternative embodiments, the pintle body 426 can be formed to define a shaped aperture 427 and both the first end 424 and the second end 425 could be attached to the fuel injector body 421 such that fuel exiting the fuel injector body 421 through the injection outlet 423 flows through the shaped aperture 427. The shaped aperture 427 can have one of an elliptical shape to provide a resulting jet of atomized fuel with a wide span (see FIG. 7) and an angular (e.g., rectangular or triangular) shape to provide the resulting jet of atomized fuel with a neutral width or narrow span (see FIGS. 8 and 9).

Figure 10:
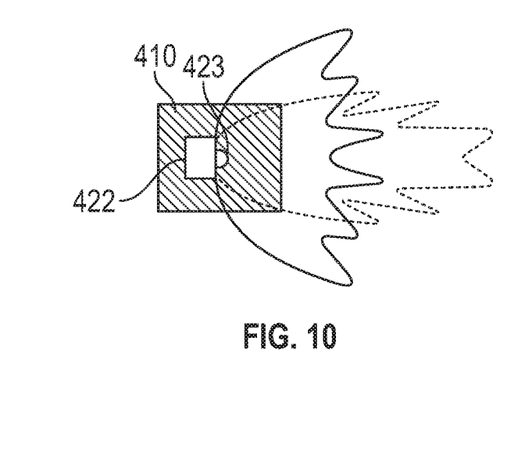
FIG. 10 is a schematic radial view of a fuel injector with a pintle of the combustor of FIG. 2 or the combustor or the augmentor of FIG. 3 in accordance with embodiments.
Figure 11:
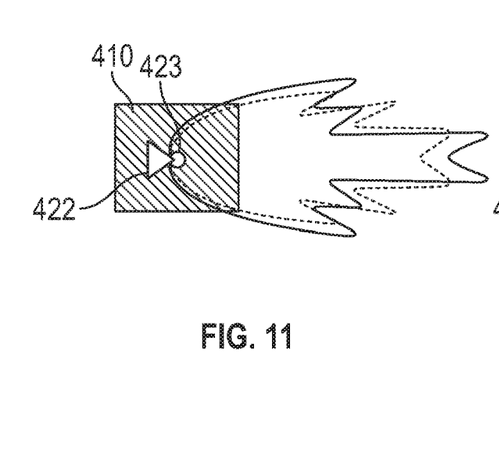
FIG. 11 is a schematic radial view of a fuel injector with a pintle of the combustor of FIG. 2 or the combustor or the augmentor of FIG. 3 in accordance with embodiments.
Figure 12:
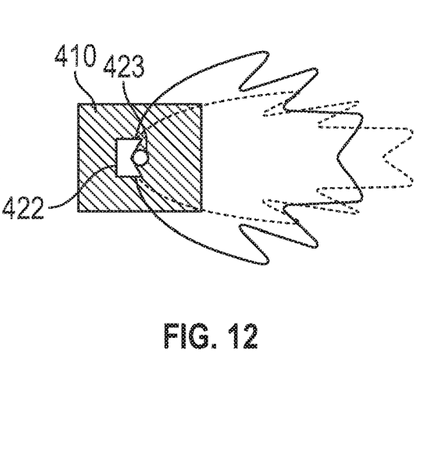
FIG. 12 is a schematic radial view of a fuel injector with a pintle of the combustor of FIG. 2 or the combustor or the augmentor of FIG. 3 in accordance with embodiments.

With reference to FIGS. 10, 11 and 12 and in accordance with further embodiments, the pintle body 426 of the pintle 422 can have one of a flat edge shape 1101 to provide a resulting jet of atomized fuel with a wide span (see FIG. 10), a convex edge shape 1201 to provide the resulting jet of atomized fuel with a narrow, extended span (see FIG. 11) and a concave edge shape 1301 to provide the resulting jet of atomized fuel with a wide, shortened span (see FIG. 12).

Figure 13:
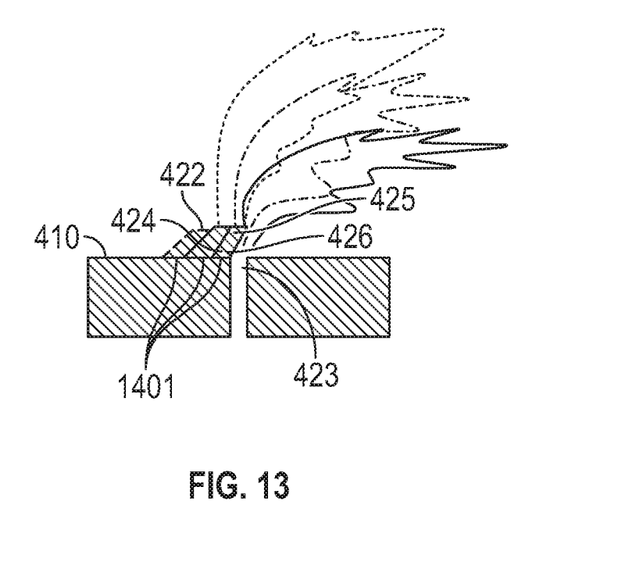
FIG. 13 is a schematic side view of a fuel injector with a movable pintle of the combustor of FIG. 2 or the combustor or the augmentor of FIG. 3 in accordance with embodiments.

With reference to FIG. 13 and in accordance with further embodiments, a point at which the first end 424 or the second end 425 of the pintle 422 attaches to the fuel injector body 421 can be defined as a connection point 1401. As shown in FIG. 13, this connection point 1401 is variable relative to the injection outlet 423 and can be moved toward or away from the injection outlet 423.

In each embodiment described herein with reference to FIGS. 2-13, the configuration and operation of the pintle 422 of each of the fuel injectors 420 can be controlled independently from the other pintles 422 in order to condition and control a shape, size and power of a jet of atomized fuel being injected into the mixing region 415. For example, in the embodiment of FIG. 3, the pintles 422 of the fuel injectors 420 which are closer to the inlet portion 413 can be operated so as to assume the configuration illustrated in FIG. 4 whereas the pintles 422 of the fuel injectors 420 which are closer to the outlet portion 414 can be operated so as to assume the configuration illustrated in FIG. 5. As such, the jets of atomized fuel associated with the fuel injectors 420 closer to the inlet portion 413 will extend further into the center of the combustor interior 412 while the jets of atomized fuel associated with the fuel injectors 420 closer to the outlet portion 414 remain comparatively close to the wall 410. The operations of the various pintles 422 can also be modified in accordance with current conditions such as inlet airflow conditions, fuel flow conditions and combustion conditions (i.e., low-load or startup conditions, intermediate-load conditions and high-load or high-demand conditions).

Figure 14:
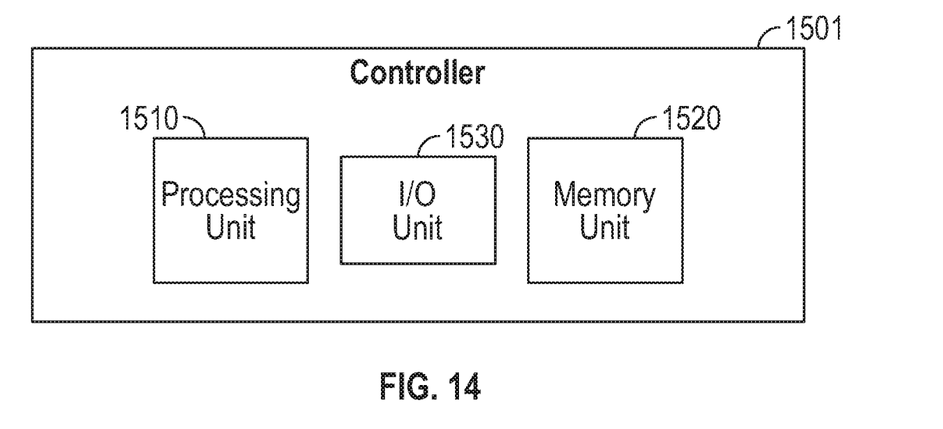
FIG. 14 is a schematic diagram of a controller of fuel injectors of a combustor in accordance with embodiments.

With reference to FIG. 14, a controller 1501 can be provided and can be operably coupled to each of the fuel injectors 420 described herein. The controller 1501 can be configured to control various operations of each of the pintles 422 in accordance with at least the current conditions. As shown in FIG. 14, the controller 1501 can include a processing unit 1510, a memory unit 1520 and an input/output (I/O) unit 1530 by which the processing unit 1510 is operably communicative with the fuel injectors 420 as well as various control elements and sensors of the gas turbine engine 20 (see FIG. 1) that govern and sense operations thereof. The memory unit 1520 has executable instructions stored thereon, which are readable and executable by the processing unit 1510. When the executable instructions are read and executed by the processing unit 1510, the executable instructions cause the processing unit 1510 to control the various operations of the fuel injectors 420 by way of the I/O unit 1530.

Figure 15:
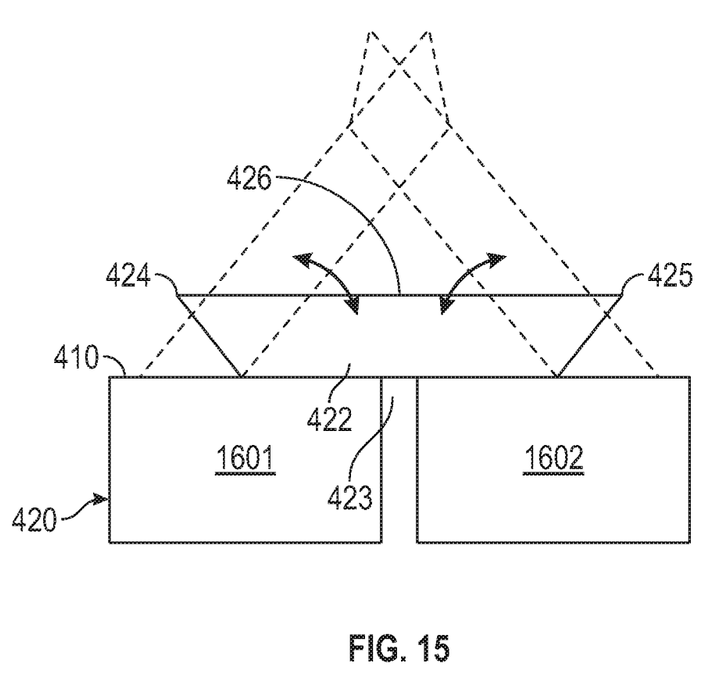
FIG. 15 is a schematic side view of a fuel injector with an electro-magnetically controlled pintle of the combustor of FIG. 2 or the combustor or the augmentor of FIG. 3 in accordance with embodiments.

With reference to FIG. 15 and in accordance with further embodiments, the at least one of the first and second ends 424 and 425 of each pintle 422 can be electro-magnetically attachable to the fuel injector body 421. That is, if the first end 424 is again defined as the upstream end and the second end 425 is again defined as the downstream end for each pintle 422 and each fuel injector 420, corresponding upstream and downstream sides of the fuel injector body 421 can be defined as upstream and downstream sides 1601 and 1602, respectively. In such cases, for each fuel injector 420, the pintle 422 can be formed with ferromagnetic material and the upstream and downstream sides 1601 and 1602 can be provided as electro-magnets that are independently supplied with current by the controller 1501. Thus, the controller 1501 can deactivate the fuel injector 420 by supplying the upstream and downstream sides 1601 and 1602 with current so as to electro-magnetically attract the first and second ends 424 and 425 toward the upstream and downstream sides 1601 and 1602, respectively. If the pintle body 426 is not found to define a pintle aperture as described above, such attraction will close off the injection outlet 423 and prevent atomized fuel from exiting the fuel injector 420. The controller 1501 can also activate the fuel injector 420 by supplying only one of the upstream and downstream sides 1601 and 1602 with current so as to electro-magnetically attract the corresponding one of first and second ends 424 and 425, respectively.

Benefits of the features described herein are the reduction of variabilities in fuel atomization processes in fuel injectors that will reduce the variabilities in fuel delivery over ranges of operating conditions of gas turbine engines to thus improve an overall operability of the gas turbine engine. In addition, variations in positions of fuel injection sprays and variations in quality of the fuel injection spray generation, which otherwise occurs with conventional fuel injection methods, will also be reduced.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor of a gas turbine engine, the combustor comprising:
   a wall defining apertures and an interior having an inlet, an outlet and a mixing region between the inlet and the outlet; and
   fuel injectors respectively arrayed along the wall at the apertures to inject fuel into the mixing region, each fuel injector comprising:
   a fuel injector body defining an injection outlet through which fuel exits the fuel injector body toward the mixing region; and a pintle comprising a first end, a second end and a pintle body extending between the first and second ends, at least one of the first and second ends being attachable to the fuel injector body to position the pintle body between the injection outlet and the mixing region, wherein at least one of:

a connection point between the at least one of the first and second ends and the fuel injector body is variable relative to the injection outlet, the at least one of the first and second ends is electro-magnetically attachable to the fuel injector body, and a controller is operably coupled to each fuel injector and configured to control operations of each pintle.

2. The combustor according to claim 1, wherein the at least one of the first and second ends is attachable to the fuel injector body such that the pintle body is angled toward the outlet.

3. The combustor according to claim 1, wherein the at least one of the first and second ends is attachable to the fuel injector body such that the pintle body is angled toward the inlet.

4. The combustor according to claim 1, wherein:

the pintle body defines a shaped aperture, and the first and second ends are attachable to the fuel injector body such that fuel exiting the fuel injector body through the injection outlet flows through the shaped aperture.

5. The combustor according to claim 4, wherein the shaped aperture has one of an elliptical and an angular shape.

6. The combustor according to claim 1, wherein the pintle has one of a flat, convex and concave shape.

7. A combustor of a gas turbine engine, the combustor comprising:

a wall defining apertures and an interior having an inlet, an outlet and a mixing region between the inlet and the outlet; and fuel injectors respectively arrayed along the wall at the apertures to inject fuel into the mixing region, each fuel injector comprising:

a fuel injector body defining an injection outlet through which fuel exits the fuel injector body toward the mixing region; and a pintle comprising a first end, a second end and a pintle body extending between the first and second ends, at least one of the first and second ends being attachable to the fuel injector body to position the pintle body between the injection outlet and the mixing region, and operations of the pintle of each fuel injector being independently controllable in accordance with current combustor conditions.

8. The combustor according to claim 7, wherein the current combustor conditions comprise inlet airflow conditions, fuel flow conditions and combustion conditions.

9. The combustor according to claim 7, further comprising a controller operably coupled to each fuel injector and configured to control operations of each pintle.

10. A fuel injector, comprising:

a fuel injector body defining an injection outlet at which fuel exits the fuel injector body; and a pintle comprising a first end, a second end and a pintle body extending between the first and second ends, at least one of the first and second ends being attachable to the fuel injector body to position the pintle body to interact with fuel exiting the fuel injector body through the injection outlet, wherein at least one of:

a connection point between the at least one of the first and second ends and the fuel injector body is variable relative to the injection outlet, and the at least one of the first and second ends is electro-magnetically attachable to the fuel injector body.

11. The fuel injector according to claim 10, wherein the at least one of the first and second ends is attachable to the fuel injector body such that the pintle body is angled in a first direction or in a second direction, respectively.

12. The fuel injector according to claim 10, wherein:

the pintle body defines a shaped aperture, and the first and second ends are attachable to the fuel injector body such that fuel exiting the fuel injector body through the injection outlet flows through the shaped aperture.

13. The fuel injector according to claim 12, wherein the shaped aperture has one of an elliptical and an angular shape.

14. The fuel injector according to claim 10, wherein the pintle has one of a flat, convex and concave shape.

15. A combustion chamber of a combustor, comprising the fuel injector of claim 10.

* * * * *